Aug. 28, 1951 W. J. STRONG 2,565,703
APPARATUS FOR SPLICING CUSHION TIRES
Filed May 22, 1948 2 Sheets-Sheet 2

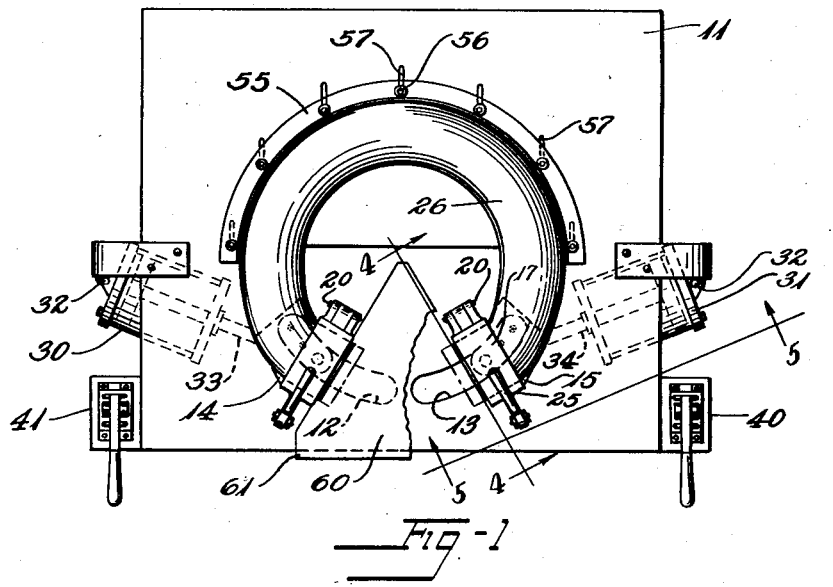

Inventor
Walter J. Strong
By
Atty

Patented Aug. 28, 1951

2,565,703

UNITED STATES PATENT OFFICE 2,565,703

APPARATUS FOR SPLICING CUSHION TIRES

Walter J. Strong, Cuyahoga Falls, Ohio, assignor to The B. F. Goodrich Company, New York, N. Y., a corporation of New York Application May 22, 1948, Serial No. 28,652

4 Claims. (Cl. 154—9)

This invention relates to the splicing of extruded unvulcanized rubber-like strip material to form annular articles and is especially useful in the splicing of cushion tire material of tubular form prior to molding of the tire although features of the invention are also useful in the splicing of other articles of rubber-like material.

The principal objects of the invention are to provide for positively holding the strip material in annular form for accurate cutting to dimensions without flattening or collapsing the material so that it is maintained in the desired shape both around its large circumference and in cross section, to provide for holding the ends of the material during the application of adhesive material thereto, and for effectively pressing the ends against each other.

These and other objects will appear from the following description and the accompanying drawings.

Of the drawings,

Fig. 1 is a plan view of apparatus constructed in accordance with and embodying the invention, with a trimmed article in place.

Fig. 2 is a front elevation thereof.

Figure 3:
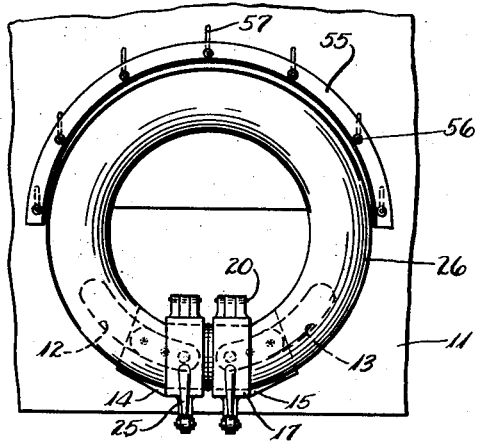
Fig. 3 is a plan view thereof with the apparatus in splicing position, parts being broken away.
Figure 5:
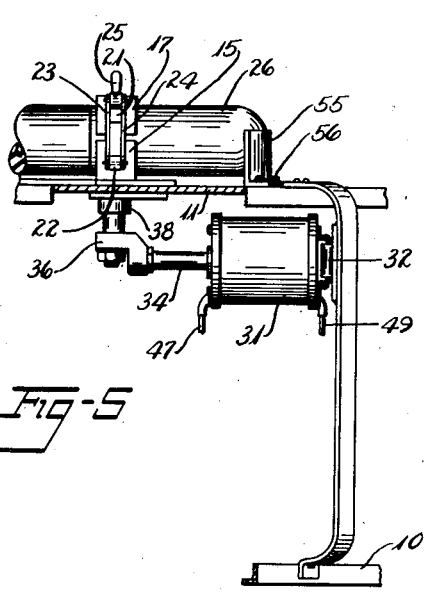
Fig. 5 is a detail sectional view, taken on line 5—5 of Fig. 1, parts being broken away.
Figure 4:
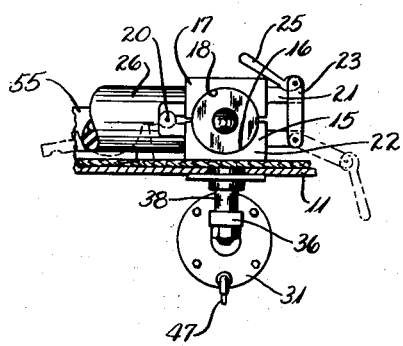
Fig. 4 is a sectional detail view, taken on line 4—4 of Fig. 1, parts being broken away.
Figure 6:
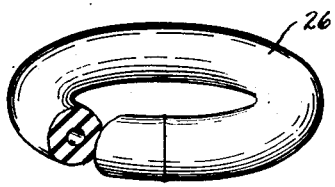
Fig. 6 is a perspective view of the spliced article.

Referring to the drawings, the numeral 10 designates a table frame having a top plate 11 formed with a pair of arcuate guideways such as slots 12, 13 of the same radius therethrough and having a common center of curvature. A pair of clamping or chuck carriages 14, 15 are slideably mounted, one in each arcuate slot for movement toward and from each other. Each clamping carriage is formed with a concave seat 16 conforming in shape to substantially one half of the cross-section of the article to be operated upon. A clamp member 17 having a work receiving seat 18, complemental to the seat 16 is provided for each carriage and is hinged thereto, as at 20, the carriage and clamp members having hinge lugs pivotally secured to each other. The arrangement is such that the material, which is generally in the form of a thick-walled tube, is gripped without flattening or collapsing it, and without requiring support of the material radially inward of the clamping surfaces.

The carriages and clamping members are also formed with clamping ears 21, 22. A pair of links 23, 24 are pivotally connected to ear 22 and their opposite ends are pivotally connected to a cam lever 25 whereby the clamping members may be forced toward the carriages and locked in the overthrow position of the cam levers to clamp the ends of the article 26 which, as shown, is a heavy walled tube of unvulcanized rubber-like material. Owing to the plastic nature of this material prior to vulcanization, it is subject to undesirable distortion if not properly handled. The apparatus herein described maintains the desired shape of the article.

For moving the carriages 14, 15 toward and from each other, a pair of double-acting fluid pressure operated cylinders 30, 31 are pivotally secured to the frame 10, as at 32. Piston rods 33, 34 are fixed at one end respectively to the pistons of the cylinders and their outer ends are pivotally connected, as at 35, 36 to posts 37, 38 secured to carriages 14, 15 respectively and extending through the arcuate slots 12, 13.

For operating the cylinders 30, 31 to move the carriages toward and from each other, a lever-operated four-way valve 40 is mounted on the frame in convenient position to the operator's right hand, and a two-way valve 41 is also mounted for operation by the operator's left hand. A compressed air line 42 from a convenient source supplies valve 41. A delivery line 43 from valve 41 extends to valve 40. Air is supplied by valve 40 to lines 44, 45 selectively. Line 44 is connected by flexible hose 46, 47 to the rod ends of cylinders 30, 31 and line 45 is similarly connected by hose 48, 49 to the opposite ends of the cylinders. The arrangement is such that cylinders 30, 31 are operated in unison and may not be operated unless both valves are operated.

For gauging the article and locating it on the table, as well as assisting to maintain the desired annular shape of the article in its large circumference, an arcuate guide 55 is adjustably secured to the table top, as by bolts 56 extending through slots 57.

For supporting the ends of the material during trimming thereof, a triangular cutting board 60 is adapted to be removably placed on the table between the carriages 14, 15. It has a locating flange 61 which rests against the front of the table.

The operation is as follows:

The carriages 14, 15 are moved apart and their clamp members 17 are swung out of the way. A length of the extruded material is bent to the approximate curvature and seated on the table against the guide 55 with its ends over the carriages 14, 15, and the article is thus braced in its desired annular shape. The clamps 17 are then latched about the ends of the strip so as to grip the material without flattening it and without requiring support of the material inwardly of the clamps. The board 60 has been positioned on the table. The ends of the material are then trimmed by hand so that the material projects slightly beyond the carriages. The exposed ends are then coated with a suitable cement or other adhesive. When the cement has dried to the desired condition for best adhesion the valves 40, 41 are operated to advance the carriages 14, 15 toward each other and force the coated ends together. The clamps are then released and the annular article lifted out. Thereafter the carriages are returned to their original positions.

Where the adhesive requires considerable time to dry to the desired condition the articles may be merely trimmed and cemented and then removed to some other support for drying the coating. The article may then be replaced in the apparatus and the coated surfaces pressed together thereby.

Variations may be made without departing from the scope of the invention as it is defined by the following claims.

I claim:

1. Apparatus for splicing together a pair of ends of tubular unvulcanized strip rubber material in thick-bodied ring form, said apparatus comprising a support having adjustable gauge means thereon for positioning the strip and seating it in determinate open-ended loop shape to facilitate sizing of the ring while the strip is in open-ended loop shape, a pair of clamping structures for said ends, each clamping structure comprising clamping sections having inner faces approximately conforming to the cross-sectional periphery of the strip of yieldable material adjacent an end thereof, means for pressing said sections toward one another to grip the material tightly while it is in said determinate open-ended shape by constrcting pressure on the strip without substantial deformation thereof, and means comprising movable elements for urging said clamping structures toward one another to press the end faces of the yieldable material together.

2. Apparatus for splicing together a pair of ends of tubular unvulcanized strip rubber material in thick-bodied ring form, said apparatus comprising a support having an arcuate gauge adjustably mounted thereon for positioning and seating the strip in determinate open-ended loop shape to facilitate sizing of the ring while the strip is in open-ended loop shape, a pair of clamping structures for said ends, each clamping structure comprising clamping sections having inner faces approximately conforming to the cross-sectional periphery of the strip of yieldable material adjacent an end thereof, means for pressing said sections toward one another to grip the material tightly while it is in said determinate open-ended shape by constricting pressure on the strip without substantial deformation thereof, and means comprising movable elements for urging said clamping structures toward one another to press the end faces of the yieldable material together.

3. Apparatus for splicing together opposite ends of a strip of unvulcanized rubber material to form an annulus thereof of determinate size, said apparatus comprising a table for supporting the material, said table having a pair of arcuate guideways extending about a common center of curvature, a pair of clamping carriages, each mounted for sliding movement on said table along one of said guideways, each carriage having a separable complemental clamp member for gripping a strip of the material near its ends by encompassing the strip, an arcuate guide mounted on said table for positioning a loop of said strip and positioning the ends of the strip for clamping by said clamp members to said carriages, and means for moving said carriages along said guides toward each other to align and press the clamped ends of the strip in abutting relation.

4. Apparatus for splicing together opposite ends of a strip of unvulcanized material to form an annulus thereof of determinate size, said apparatus comprising a table for supporting the material, said table having a pair of arcuate slots therethrough extending about a common center of curvature, a pair of clamping carriages, each mounted in one of said slots for sliding movement on said table along said slots, each carriage having a separable complemental clamp member for gripping a strip of the material near its ends by encompassing the strip, an arcuate guide mounted on said table for positioning a loop of said strip and positioning the ends of the strip for clamping by said clamp members, and means below said table for moving said carriages along said slots toward each other to align and press the clamped ends of the strip in abutting relation.

WALTER J. STRONG.

REFERENCES CITED

The following references are of record in the file of this patent:

UNITED STATES PATENTS

| Number | Name | Date |
| --- | --- | --- |
| 1,666,380 | Heinle | Apr. 17, 1928 |
| 1,719,206 | Young | July 2, 1929 |
| 1,865,669 | Bostwick | July 5, 1932 |
| 1,869,690 | Homier et al. | Aug. 2, 1932 |
| 2,019,361 | Roberts | Oct. 29, 1935 |
| 2,024,149 | Daly | Dec. 17, 1935 |
| 2,510,715 | Peterson et al. | June 6, 1950 |

FOREIGN PATENTS

| Number | Country | Date |
| --- | --- | --- |
| 505,866 | Great Britain | May 18, 1939 |